United States Patent
Chen

(10) Patent No.: US 7,613,205 B1
(45) Date of Patent: Nov. 3, 2009

(54) TOKEN-ASSIGNMENT NETWORKS OVER ETHERNET AND METHODS THEREFOR

(75) Inventor: Chih-Ming Chen, Taipei (TW)

(73) Assignee: Trend Micro Incorporated, Yoyogi, Shibuya-ku (JP)

( * ) Notice: Subject to any disclaimer, the term of this patent is extended or adjusted under 35 U.S.C. 154(b) by 664 days.

(21) Appl. No.: 11/388,444

(22) Filed: Mar. 24, 2006

(51) Int. Cl.
*H04L 12/42* (2006.01)
(52) U.S. Cl. ..................................... 370/450
(58) Field of Classification Search ............... None
See application file for complete search history.

(56) References Cited

U.S. PATENT DOCUMENTS

| | | | | |
|---|---|---|---|---|
| 4,926,418 A | * | 5/1990 | Cidon et al. | 370/455 |
| 5,081,623 A | * | 1/1992 | Ainscow | 370/451 |
| 5,414,833 A | * | 5/1995 | Hershey et al. | 726/22 |
| 5,566,177 A | * | 10/1996 | Bhandari et al. | 370/452 |
| 6,483,846 B1 | * | 11/2002 | Huang et al. | 370/445 |
| 7,308,493 B2 | * | 12/2007 | Liang | 709/223 |
| 2004/0205419 A1 | | 10/2004 | Liang et al. | |

* cited by examiner

*Primary Examiner*—Frank Duong
(74) *Attorney, Agent, or Firm*—IP Strategy Group, P.C.

(57) ABSTRACT

A token-assignment network implemented out of existing computers that are interconnected in an Ethernet network. The token-assignment mode ensures that each computer in the token-assignment network has a turn at transmitting, thus preventing starvation of any particular computer in the token-assignment network. In this manner, computers of the token-assignment network are able to continue functioning even during a virus outbreak, thereby enabling business to continue and/or virus remedial actions to be taken via the network.

22 Claims, 4 Drawing Sheets

TOKEN-ASSIGNMENT NETWORKS OVER ETHERNET AND METHODS THEREFOR

BACKGROUND OF THE INVENTION

The Ethernet protocol has long been employed to implement computer networks wherein multiple computing devices (comprising for example computers, printers, scanners, etc.) are coupled together. In an Ethernet network, any device can exchange traffic with any other device via the transmission medium, which is typically the Ethernet cabling medium.

To facilitate discussion, FIG. 1 shows a segment of a typical Ethernet network, comprising four computers 102, 104, 106, and 108 all coupled to communicate via an Ethernet cable 110. If multiple devices attempt to communicate simultaneously on the same Ethernet cable 110, traffic collision occurs. To solve the traffic collision problem, Ethernet networks typically employ CSMA/CD (Carrier Sense Multiple Access/Collision Detection), which is a protocol for determining how network devices handle traffic collision. Generally speaking, CSMA/CD requires a network device to monitor the traffic on the transmission medium and transmit if there is no traffic on the transmission medium. If multiple devices attempt to transmit simultaneously, a collision occurs and is detected by all monitoring network devices. A network device thwarted by a network collision will set a random timer, and will attempt to transmit again when the timer expires. If another collision occurs, the random time interval is increased, and a longer time period would pass before that network device would attempt to transmit again. The exponential back off occurs until the network device is able to transmit its messages. CSMA/CD is well-known and is well documented in standards such as IEEE 802.3 and ISO 8802.3.

When one of the computers on an Ethernet network is infected with a virus, the virus may cause the infected computer to send out a large volume of packets, such as email packets, on the Ethernet network. The massive volume of data transmission by the infected computer in effect shuts down the network since no other network device may be able to employ the transmission medium for data transmission. By way of example, a network device adhering to the CSMA/CD will keep increasing its random wait time interval each time it attempts to transmit and fails. After some time, the network essentially bogs down.

SUMMARY OF INVENTION

The invention relates, in an embodiment, to a method for implementing an ad-hoc token-assignment network from a plurality of computers interconnected in an Ethernet network upon detecting one of a potential virus infection and an actual virus infection affecting the Ethernet network. The method includes activating a token-management application in a first computer of the plurality of computers, the activating the token-management application causing the first computer to enter into a token-management role as a token-managing device ("TMD"). The method also includes activating a first network interface card filter in a second computer of the plurality of computers. Activating the first network interface card filter causes the second computer to enter into a token-sharing role as a first token-sharing computer ("first TSC"). The method further includes activating a second network interface card filter in a third computer of the plurality of computers. Activating the second network interface card filter causes the third computer to enter into the token-sharing role as a second token-sharing computer ("second TSC"), wherein the TMD manages a token-sharing schedule to determine the time period during which one of the first TSC and the second TSC is permitted to transmit data, the first TSC is permitted to transmit only if the first TSC is granted a token by the TMD, the second TSC is permitted to transmit only if the second TSC is granted the token by the TMD.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
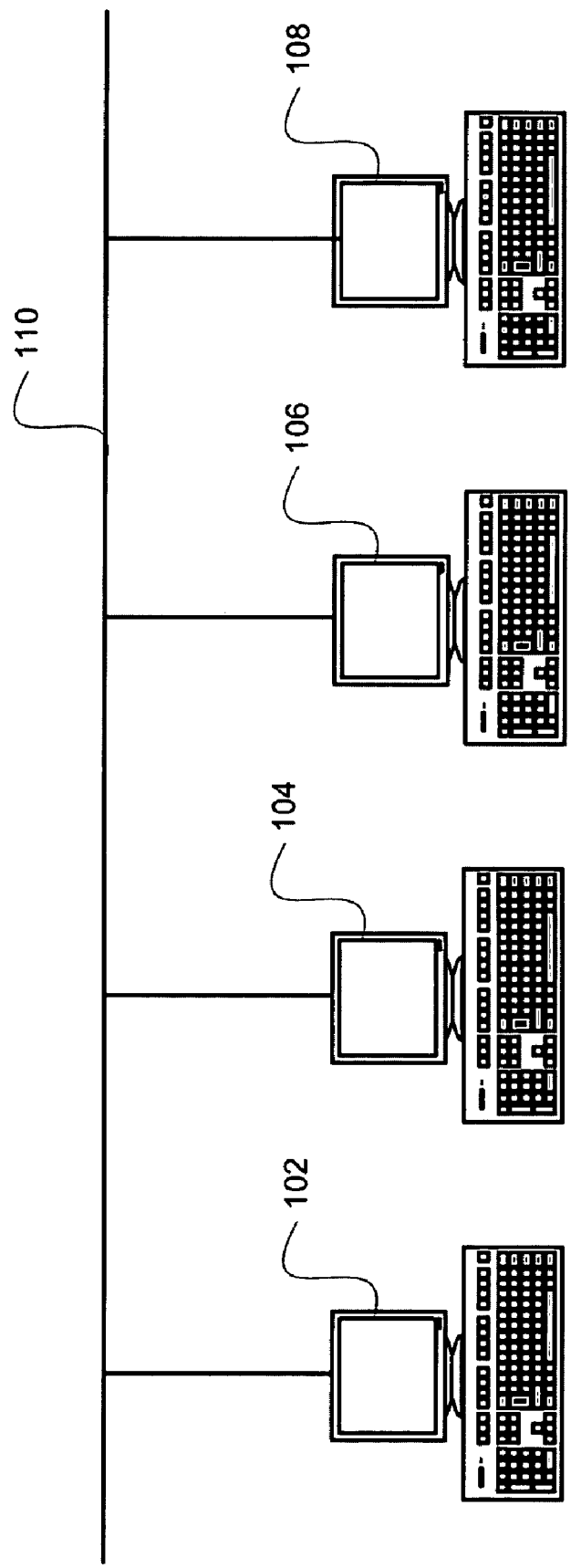
FIG. 1 shows a segment of a typical Ethernet network.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, a token-assignment paradigm is implemented to prevent a network congestion that is caused by a virus infection from paralyzing the Ethernet network. In an embodiment, a plurality of computers are coupled to the same Ethernet network with one of the computers being designated a token-managing device (TMD) and the remaining computers deemed to be token-sharing computers (TSC). In its token-management role, the main task of the TMD is to manage a token, deciding which of the TSC would be granted the token and for how long.

In its token-sharing role, a TSC can transmit only if it is granted the token by the TMD. Generally speaking, the token is granted in accordance with some token time-sharing schedule. The token time-sharing schedule may specify that all TSCs would be granted the token for an equal amount of time. The token time-sharing schedule may also specify that certain TSCs be granted the token for a longer period of time than others (e.g., to allow for a heavily used server, for example). The token time-sharing schedule may also specify that the TSCs be granted the token on a round-robin basis, or that certain TSCs may take precedence.

Each TSC is granted the token for a limited time to ensure that all TSCs have a turn at transmitting. Thus, even if one of the TSCs is infected (or even if multiple TSCs are infected), the remaining TSCs can still transmit. This is unlike the prior art situation wherein a congested network will cause a computer to keep retrying, with each interval between retries being progressively lengthened per the CSMA/CD specification.

If the allotted time for a TSC to transmit its information expires, the TSC returns the token to the TMD to permit the TMD to assign the token to another TSC even if that original TSC still has data to transmit. In an embodiment, the TSC is configured to simply stop transmitting upon the expiration of its token. In an embodiment, the TMD automatically assumes that the token is returned after the expiration of the time period associated with the previously assigned token and assigns the token to another TSC. Accordingly, even if the TSC that was last granted the token experienced a system crash, the token is not hung up at that TSC and other TSCs would still have their turns at transmitting. Normally, if the TSC is finished with its transmission within its allotted time period, the TSC can return the token to the TMD (or simplify notify the TMD) to allow the TMD to assign the token to another TSC.

In an embodiment, the TMD has the token-management application as well as the token time-sharing schedule. A token-compliant agent is installed at each TSCs in a given network. The TMD and its associated TSCs generally reside in the same subnetwork (e.g., local area network). However, as long as the TMD and its associated TSCs can communicate, there are no topological or geographical restrictions to the token-assignment network (TAN) formed by a TMD and its associated TSCs. In accordance with an embodiment of the present invention, a TMD and its various TSCs can be associated with different subnetworks. As such, embodiments of the invention enable the creation of an ad-hoc token-assignment network by grouping together seemingly unrelated TMD and various TSCs (which may not, in normal operation, be thought of as belonging in a logical sub-network) in order to handle a virus outbreak.

In an embodiment, the token-compliant agent is implemented by a NIC (network interface card) filter driver. The NIC filter driver in a TSC ascertains from the token received from the TMD the time period during which transmission is permitted and allows the TSC to transmit for no longer than the allowed transmission time period. In an embodiment, the NIC filter driver is implemented by a NDIS (Network Device Interface Specification) filter driver. NDIS is a specification promulgated by the Microsoft Corporation (Redmond, Wash.) and 3COM (Marlborough, Mass.) to allow a NIC to support different protocols.

As mentioned earlier, a TSC can only transmit data if it is granted the token. In an embodiment, however, the out-of-band Ethernet channel is monitored to ascertain whether a particular computer which has not been granted the token wishes to join the token-assignment network. In other words, computers can use the Ethernet out-of-band channel(s) to transmit information pertaining to the token-assignment network maintenance tasks.

TMD vulnerability to virus infection is also addressed by embodiments of the invention. In other words, although TSC transmission is governed by the time period associated with the granted token, no such time restriction is placed on the TMD. In an embodiment, a filter agent (which may be part of the token-management application or may be a separate application/agent in the TMD) may be employed to allow the TMD to only transmit, during periods of high risk of virus infection, data pertaining to the token management role, e.g., data pertaining to the management and maintenance of the token-assignment network. Alternatively, in an embodiment, the filter may limit the type of data transmitted to only data pertaining to the token management role and perhaps only a subset of the types of data that the TMD is allowed to transmit prior to entering the token-management role. This filter agent may be implemented in a firewall, for example.

Alternatively or additionally, security may be enhanced for the computer designated to be the TMD. It is the expectation of the inventor that it is less expensive and there are fewer performance/cost penalties associated with securing a single computer destined to be the TMD during periods of high virus infection risk than to attempt to secure every computer and every vulnerable points in a network.

Figure 2:
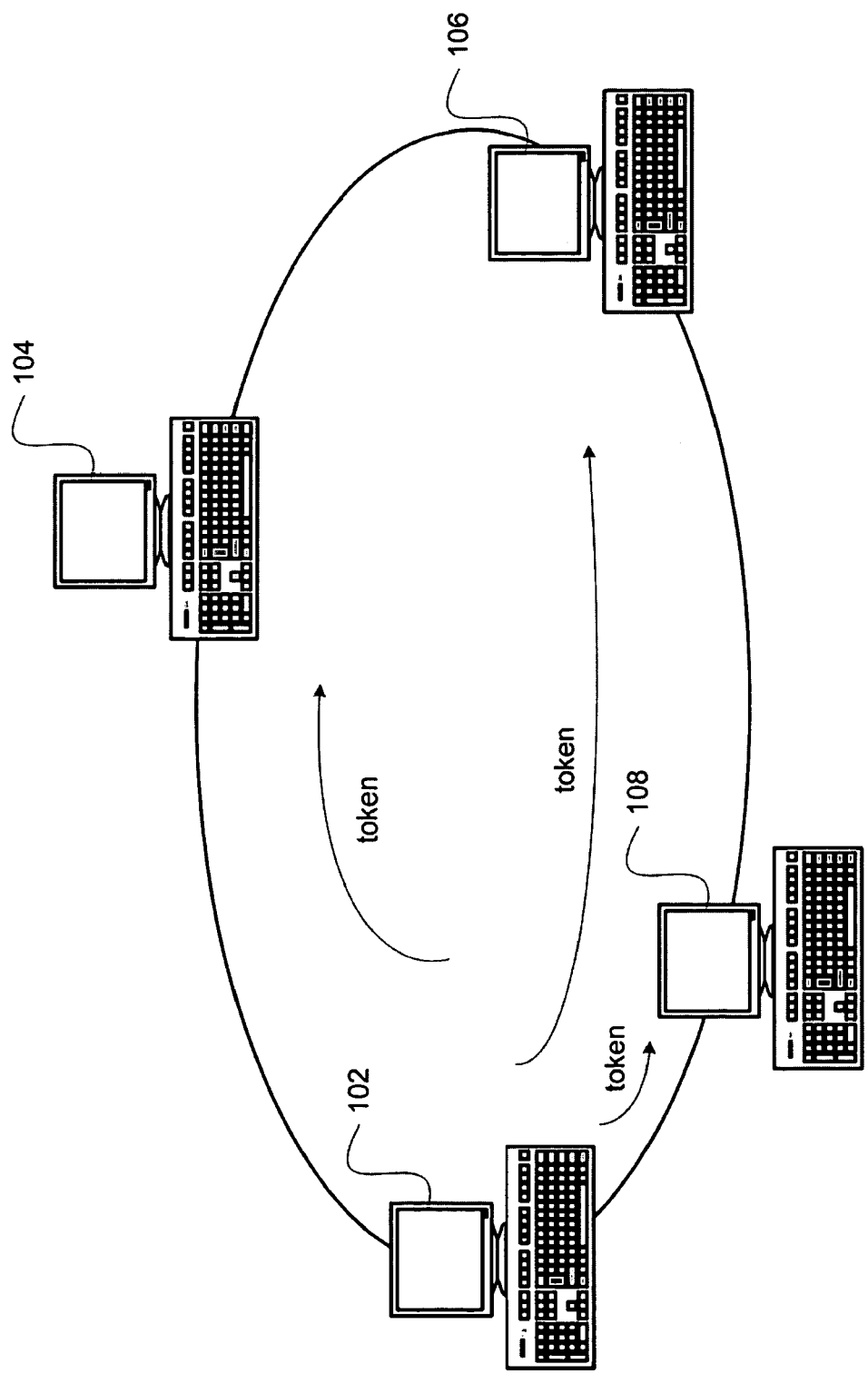
FIG. 2 shows, in accordance with an embodiment of the invention, a token-assignment network formed by the computers of FIG. 1.

The features and advantages of the present invention may be better understood with reference to the drawings and discussions that follow. FIG. 2 shows, in accordance with an embodiment of the present invention, a logical topology of a token-assignment network formed from the computers of FIG. 1. The token-assignment network of FIG. 2 may be formed upon detection of a virus infection that may overwhelm an Ethernet network (e.g., via a denial-of-service attack or some broadcast virus mechanism). In an embodiment, the computers may enter into a token-assignment network mode when there exists a prediction of an imminent virus attack. Such imminent attack may be forecasted using, for example, early warning alert technologies (referred to herein as "CAV") available from Trendmicro, Inc. of Cupertino, Calif. One example of such early warning alert is described in a commonly-assigned, co-pending patent application entitled "Multi-Level Virus Outbreak Alert Based On Collaborative Behavior," filed on Apr. 10, 2003, U.S. application Ser. No. 10/411,665, which is incorporated by reference herein. In this manner, although some performance degradation may be experienced by the transmission-throttling mechanism of the token-assignment paradigm (which degradation may be ameliorated using an appropriate token-assignment schedule), a computer entering the token-assignment network mode as a TSC may continue to operate without interruption even before the virus outbreak occurs. This embodiment allows certain critical servers to continue to operate in the event of a virus attack without interruption.

Returning now to FIG. 2, suppose computer 102 is designated in advance to be the TMD for the token-assignment network. Upon detection of a potential or actual virus outbreak, computer 102 activates its token management application to enter the token-assignment network mode. Other computers 104, 106, and 108 activate their own NIC-filter drivers to enter the token-assignment network as well. Since the TMD controls the transmit schedule, it knows when the network is not busy and can employ that time to transmit token assignments. The TMD can broadcast promiscuously (i.e., to all computers) to inform them of the need to enter into a token-assignment network mode as well. Alternatively or additionally, the TMD may employ out-of-band channels to transmit packets pertaining to the configuration, management, and/or maintenance of the token-assignment network.

The token may be implemented by, for example, a packet of data which carries information identifying itself as a token-assignment network configuration and/or maintenance packet, as well as information identifying the token-assignment network to which the token is associated, the identity of the token recipient computer, and the time duration during which transmission is permitted. During the token-assignment network configuration period, handshaking packets may also be exchanged, if desired.

It is anticipated that with the detection of the potential or actual virus infection, computers on the network may increase their virus detection and/or scanning activities to control the outbreak. In an embodiment, a user-level fair share scheduler (such as one available from Trendmicro, Inc.) may be employed to ensure that the background virus detection/scanning activities do not take up an undue amount of resources. In an embodiment, the virus detection and/or scanning activities on a transmitting TSC may be temporarily scaled back to ensure that the transmitting TSC can devote resources to the data processing and transmission tasks during the period during which it is permitted to transmit.

The token-assignment network mode may be exited by the TMD informing the TSCs that the virus danger has passed. Alternatively or additionally, this informing task may be performed by a CAV server, either asynchronously or on a scheduled basis. Alternatively or additionally, the token-network assignment mode may be exited manually at each computer.

Figure 3:
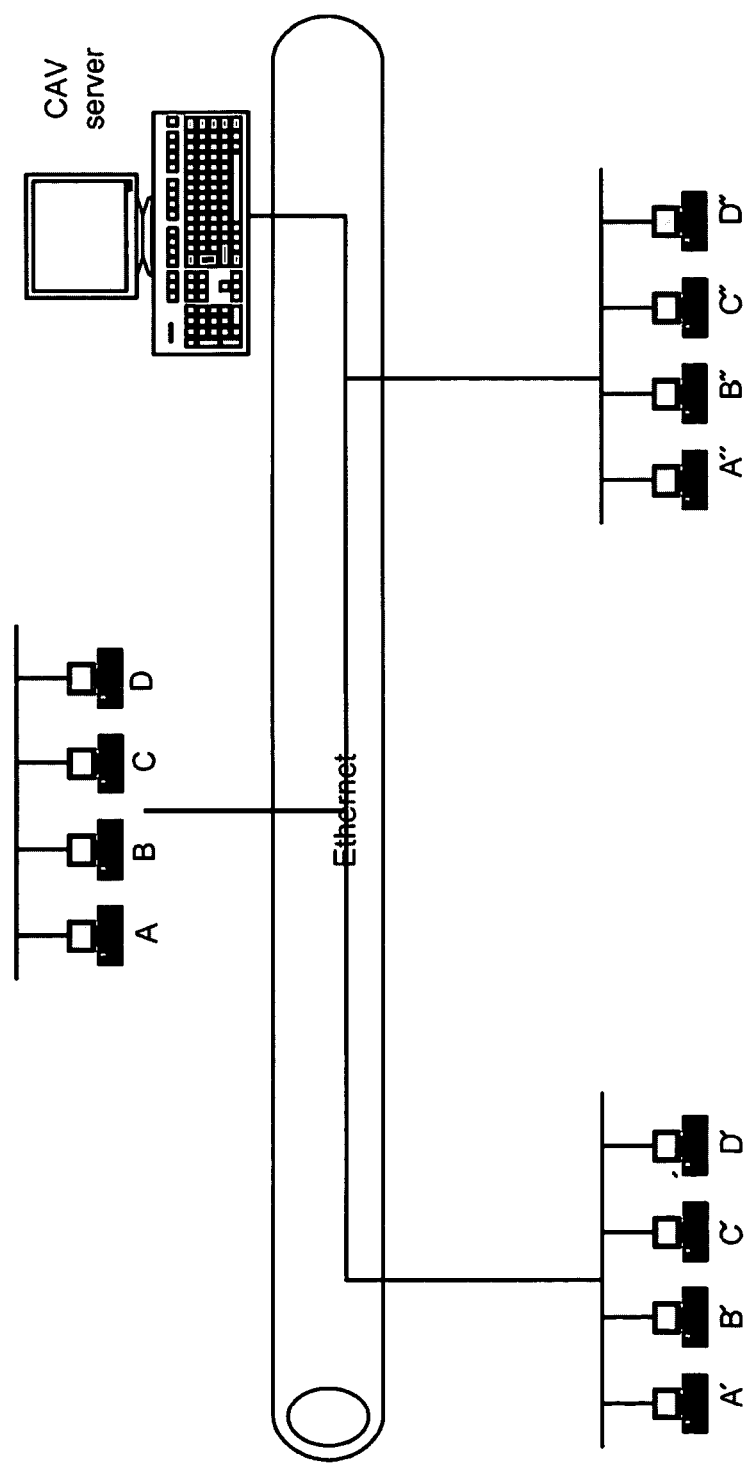
FIG. 3 shows different Ethernet network comprising a plurality of sub-networks.
Figure 4:
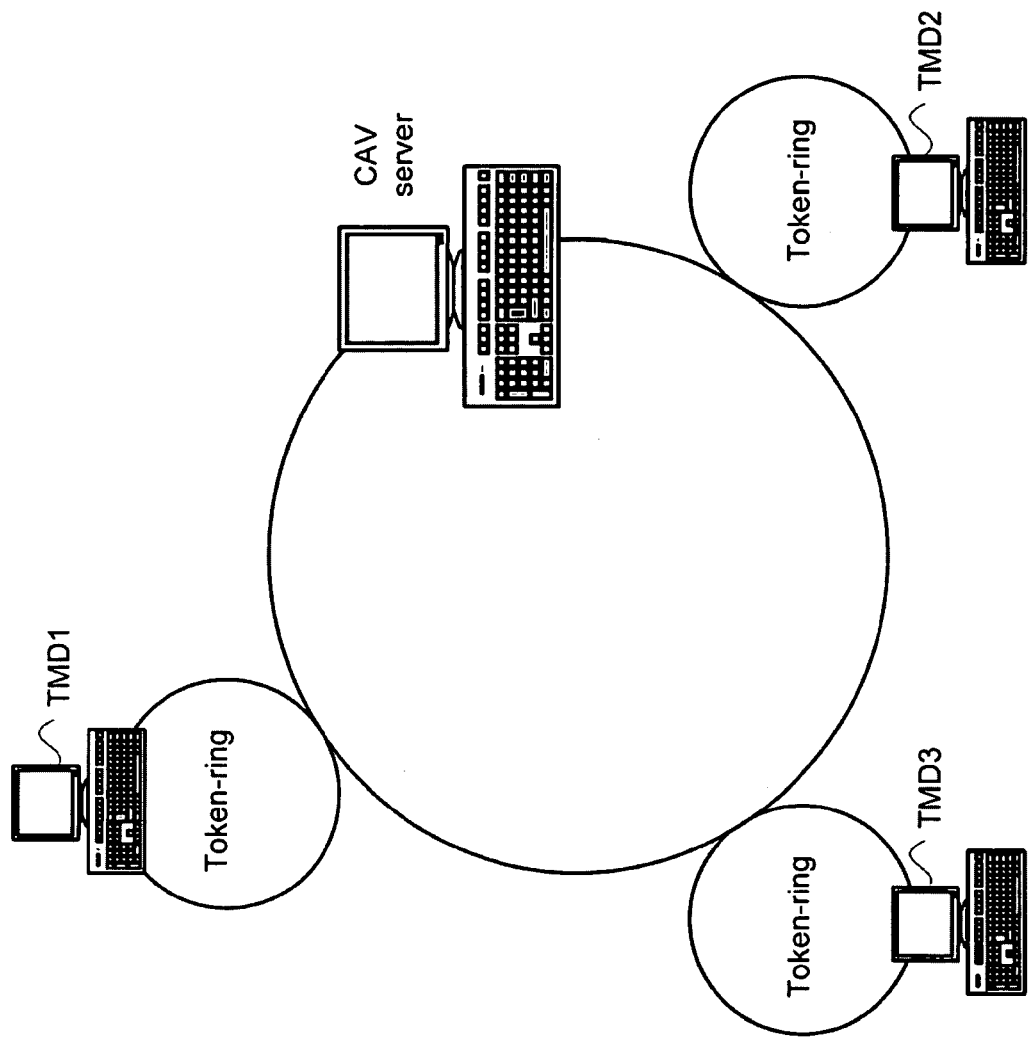
FIG. 4 shows, in accordance with an embodiment of the present invention, a token-assignment network formed by the computers of FIG. 3.

To allow for complex topologies, a CAV agent may be employed to bridge CAV clients and CAV server, as shown in FIG. 4. Compared to the "normal" Ethernet topology of FIG. 3 (which shows the computers before they enter the token-assignment network mode), the CAV agent in each sub-ring (e.g., TMD1, TMD2, and TMD3) is responsible for notifying the computers to enter into the token-assignment network mode and to conduct sub-ring maintenance on behalf of the CAV server.

As can be appreciated from the foregoing, embodiments of the invention enables the creation of a token-assignment network out of existing computers that are coupled together in an Ethernet network. The token-assignment mode ensures that each computer in the token-assignment network has a turn at transmitting, thus preventing starvation of any particular computer in the token-assignment network. In this manner, computers of the token-assignment network are able to continue functioning even during a virus outbreak, thereby enabling business to continue and/or virus remedial actions to be taken via the network.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for implementing an ad-hoc token-assignment network from a plurality of computers interconnected in an Ethernet network upon detecting one of a potential virus infection and an actual virus infection affecting said Ethernet network, comprising:

activating a token-management application in a first computer of said plurality of computers, said activating said token-management application causing said first computer to enter into a token-management role as a token-managing device ("TMD");

activating a first network interface card filter in a second computer of said plurality of computers, said activating said first network interface card filter causing said second computer to enter into a token-sharing role as a first token-sharing computer ("first TSC"); and activating a second network interface card filter in a third computer of said plurality of computers, said activating said second network interface card filter causing said third computer to enter into said token-sharing role as a second token-sharing computer ("second TSC"), wherein said TMD manages a token-sharing schedule to determine the time period during which one of said first TSC and said second TSC is permitted to transmit data, said first TSC is permitted to transmit only if said first TSC is granted a token by said TMD, said second TSC is permitted to transmit only if said second TSC is granted said token by said TMD.

2. The method of claim 1 wherein said second computer and said third computer enter said token-sharing role upon receiving a message broadcasted by said first computer to request said second computer and said third computer to enter said token-sharing role.

3. The method of claim 1 wherein said network interface card filter represents a NDIS (Network Device Interface Specification) filter.

4. The method of claim 1 wherein said first computer, said second computer, and said third computer are in different sub-networks prior to entering said respective token-management role and said token-sharing role.

5. The method of claim 1 wherein said token-assignment network is implemented in advance of said virus infection when said virus infection is forecasted.

6. The method of claim 1 further comprising:

activating a filter in a firewall associated with said first computer upon said first computer entering said token-management role, said filter preventing a virus infecting said first computer for transmitting data other than data pertaining to one of configuration, management, and maintenance of said token-assignment network.

7. The method of claim 1 wherein said token is assigned to said first TSC, said token is then automatically assigned to said second TSC upon expiration of a transmission time period associated with said token assigned to said first TSC irrespective whether said first TSC has returned said token to said TMD.

8. The method of claim 1 wherein said token is assigned to said first TSC, said token is then assigned to said second TSC after said first TSC returns said token to said TMD even if a transmission time period associated with said token assigned to said first TSC has not expired.

9. A method for implementing an ad-hoc token-assignment network from a plurality of computers interconnected in an Ethernet network upon detecting one of a potential virus infection and an actual virus infection affecting said Ethernet network, comprising:

activating a token-management application in a first computer of said plurality of computers, said activating said token-management application causing said first computer to enter into a token-management role as a token-managing device ("TMD");

activating a first network interface card filter in a second computer of said plurality of computers, said activating said first network interface card filter causing said second computer to enter into a token-sharing role as a first token-sharing computer ("first TSC");

activating a second network interface card filter in a third computer of said plurality of computers, said activating said second network interface card filter causing said third computer to enter into said token-sharing role as a second token-sharing computer ("second TSC"), wherein said TMD manages a token-sharing schedule to determine the time period during which one of said first TSC and said second TSC is permitted to transmit data, said first TSC is permitted to transmit only if said first TSC is granted a token by said TMD, said second TSC is permitted to transmit only if said second TSC is granted said token by said TMD, wherein at least two of said first computer, said second computer and said third computers are implemented in different Ethernet sub-networks prior to said token-assignment network being entered.

10. The method of claim 9 wherein said second computer and said third computer enter said token-sharing role upon receiving a message broadcasted by said first computer to request said second computer and said third computer to enter said token-sharing role.

11. The method of claim 9 wherein said network interface card filter represents a NDIS (Network Device Interface Specification) filter.

12. The method of claim 9 wherein said token-assignment network is implemented in advance of said virus infection when said virus infection is forecasted.

13. The method of claim 9 further comprising:
activating a filter in a firewall associated with said first computer upon said first computer entering said token-management role, said filter preventing a virus infecting said first computer for transmitting data other than data pertaining to one of configuration, management, and maintenance of said token-assignment network.

14. The method of claim 9 wherein said token is assigned to said first TSC, said token is then automatically assigned to said second TSC upon expiration of a transmission time period associated with said token assigned to said first TSC irrespective whether said first TSC has returned said token to said TMD.

15. The method of claim 9 wherein said token is assigned to said first TSC, said token is then assigned to said second TSC after said first TSC returns said token to said TMD even if a transmission time period associated with said token assigned to said first TSC has not expired.

16. A method for implementing an ad-hoc token-assignment network from a plurality of computers interconnected in an Ethernet network, comprising:
receiving a virus infection forecast, including information specifying that said virus infection is due to occur; and
activating said token-assignment network upon said receiving said virus infection forecast by:
activating a token-management application in a first computer of said plurality of computers, said activating said token-management application causing said first computer to enter into a token-management role as a token-managing device ("TMD"),
activating a first network interface card filter in a second computer of said plurality of computers, said activating said first network interface card filter causing said second computer to enter into a token-sharing role as a first token-sharing computer ("first TSC"), and
activating a second network interface card filter in a third computer of said plurality of computers, said activating said second network interface card filter causing said third computer to enter into said token-sharing role as a second token-sharing computer ("second TSC"), wherein said TMD manages a token-sharing schedule to determine the time period during which one of said first TSC and said second TSC is permitted to transmit data, said first TSC is permitted to transmit only if said first TSC is granted a token by said TMD, said second TSC is permitted to transmit only if said second TSC is granted said token by said TMD.

17. The method of claim 16 wherein said second computer and said third computer enter said token-sharing role upon receiving a message broadcasted by said first computer to request said second computer and said third computer to enter said token-sharing role.

18. The method of claim 16 wherein said network interface card filter represents a NDIS (Network Device Interface Specification) filter.

19. The method of claim 16 further comprising:
activating a filter in a firewall associated with said first computer upon said first computer entering said token-management role, said filter preventing a virus infecting said first computer for transmitting data other than data pertaining to one of configuration, management, and maintenance of said token-assignment network.

20. The method of claim 16 wherein said token is assigned to said first TSC, said token is then automatically assigned to said second TSC upon expiration of a transmission time period associated with said token assigned to said first TSC irrespective whether said first TSC has returned said token to said TMD.

21. The method of claim 16 wherein said token is assigned to said first TSC, said token is then assigned to said second TSC after said first TSC returns said token to said TMD even if a transmission time period associated with said token assigned to said first TSC has not expired.

22. The method of claim 16 wherein said token-management application is configured to limit the types of data transmitted by said first computer in said token-management role to data pertaining to said token management role and first data type, said first data type representing one of no data and at most a subset of the types of data transmitted by said first computer prior to entering said token management role.

* * * * *